July 18, 1933.  D. N. FANTACI  1,918,387
WINDSHIELD HEATER
Original Filed Jan. 8, 1931    3 Sheets-Sheet 1

Inventor
Dominic N. Fantaci
By Clarence A. O'Brien
Attorney

July 18, 1933.  D. N. FANTACI  1,918,387
WINDSHIELD HEATER
Original Filed Jan. 8, 1931   3 Sheets-Sheet 3

Inventor
Dominic N. Fantaci
By Clarence A. O'Brien
Attorney

Patented July 18, 1933

1,918,387

UNITED STATES PATENT OFFICE

DOMINIC N. FANTACI, OF ELMHURST, NEW YORK

WINDSHIELD HEATER

Application filed January 8, 1931, Serial No. 507,504. Renewed May 15, 1933.

This invention relates to certain new and useful improvements in windshield heaters, and the primary object of this invention is to provide a windshield heater capable of directing air on to the windshield.

A still further object of the invention is to provide a heater of the above mentioned character whereby the air may be heated either from the exhaust manifold of the internal combustion engine, or by a suitable electric heater as may be found desirable.

A still further object of the invention is to provide a windshield heater including a casing from which is directed the heater air on to the windshield, which casing is suitably provided so that personal contact will not result in injury by burns.

A still further object is to provide a windshield heater of the above mentioned character, which will insure a direction of heated air upon the windshield for substantially the full length of the windshield to maintain the same free of deposits of snow, sleet and the like whereby the operator of the vehicle will at all times have clear vision thus enabling him, in inclement weather, to pilot the vehicle in apparent safety.

Other objects and advantages of the invention will become apparent during a study of the following description, taken in connection with the accompanying drawings wherein.

With reference more in detail to the drawings, it will be seen that the windshield heater according to the present invention, comprises a relatively elongated casing 5 that is substantially cylindrical in cross section and is closed at its ends. Casing 5 is provided with inner and outer walls 6 and 7 to provide therebetween and air space 8 whereby personal contact with the casing will not result in injury by burns.

Figure 5:
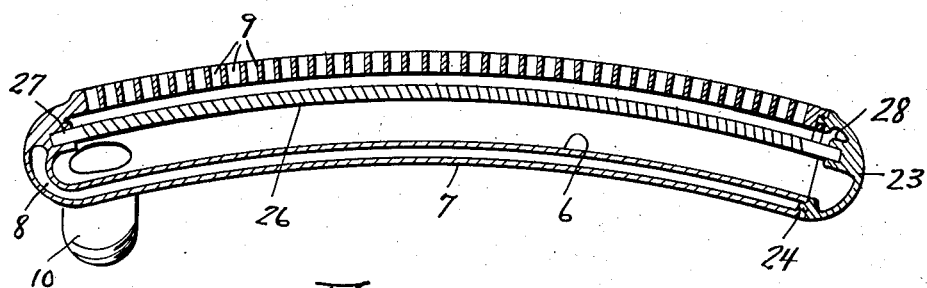
Figure 5 is a longitudinal sectional view taken through the heater casing.

Casing 5 is somewhat bowed longitudinally as suggested in Figure 5, and is adapted to be supported horizontally on the instrument board B of the automobile a portion of which is shown in the drawings and designated by the reference character A.

At the top thereof, the casing is provided with a longitudinal series of cylindrical air discharge openings 9. Openings 9 are disposed at an incline for directing the air against the windshield W.

Adjacent one end thereof casing 5 is provided with a cylindrical inlet neck 10 projecting therefrom at substantially right angles to the discharge apertures 9, and said neck 10 extends through an opening 11 provided therefor in the instrument board B.

The internal combustion engine of the vehicle is designated by the reference character E, and the same is equipped with the usual exhaust manifold M.

An air conduct casing 12 is adapted to receive therein the horizontal portion of the exhaust manifold M, one wall of casing 12 being provided with an elongated slot 13 through which the manifold branch is received into the casing 12. Casing 12 at the forward end thereof tapers to terminate in a restricted inlet mouth 14. At the rear or widest end thereof the casing is provided with an outlet 15. It may be noted, that the bottom wall of casing 12 is disposed substantially horizontal, while the top wall 12 inclines upwardly and rearwardly. Casing 12 may be bolted or otherwise secured to the block of the internal combustion engine as at 16.

A conduit pipe 17 connects the outlet 15 of casing 12 with the inlet 10 of casing 5. One end of the conduit 17 is coupled to the inlet 15 through the medium of a flanged sleeve 18, which sleeve 18 is threadedly engaged with the outlet neck 15, and the sleeve has the flange 19 thereof engageable with the flange 20 of the pipe 17.

The upper end of conduit pipe 17 is coupled to the inlet 10 in a similar manner as at 21. For controlling the passage of heated air from casing 12 into casing 5 there is suitably arranged within the pipe conduit 17 a manually operable valve 22.

From the foregoing it will be apparent, that air entering through the inlet 14 of casing 12, will be heated through the medium of the exhaust manifold M, and the air thus heated will pass from the casing through the pipe conduit 17 into casing 5 to discharge therefrom through apertures 9 directly on to the windshield W. The heated air will thus melt all snow and ice gathering on the windshield, thus preventing accumulation of snow and ice on the windshield as would obscure the vision of the operator of the vehicle.

According to the present invention, the casing 5 remote from that end of the casing equipped with the inlet neck 10, is open, and a suitable end plate or cap 23 is provided for closing said end of the casing. Cap 23 may be threadedly engaged with the walls of the casing as at 24.

Figure 1:
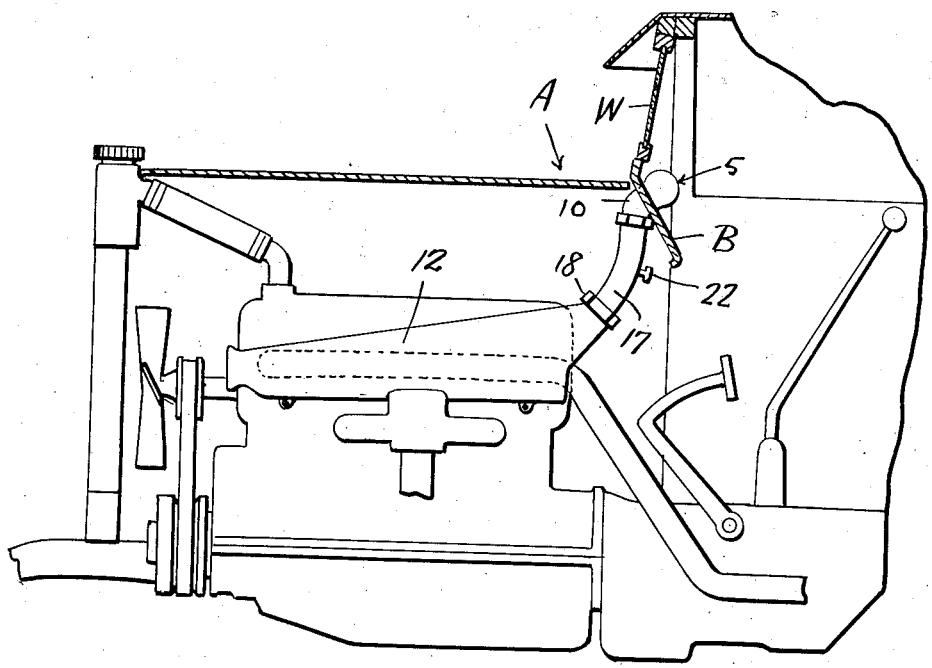
Figure 1 is a fragmentary sectional elevational view through a vehicle showing the application of my invention thereto.
Figure 2:
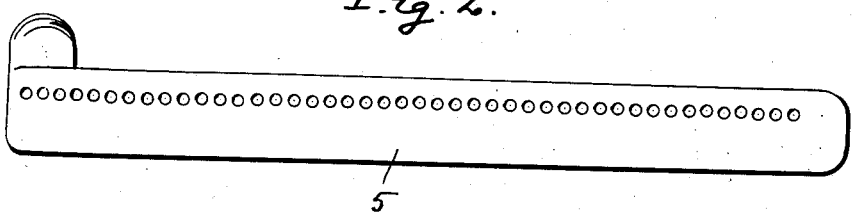
Figure 2 is a plan view of the heater casing.
Figure 3:
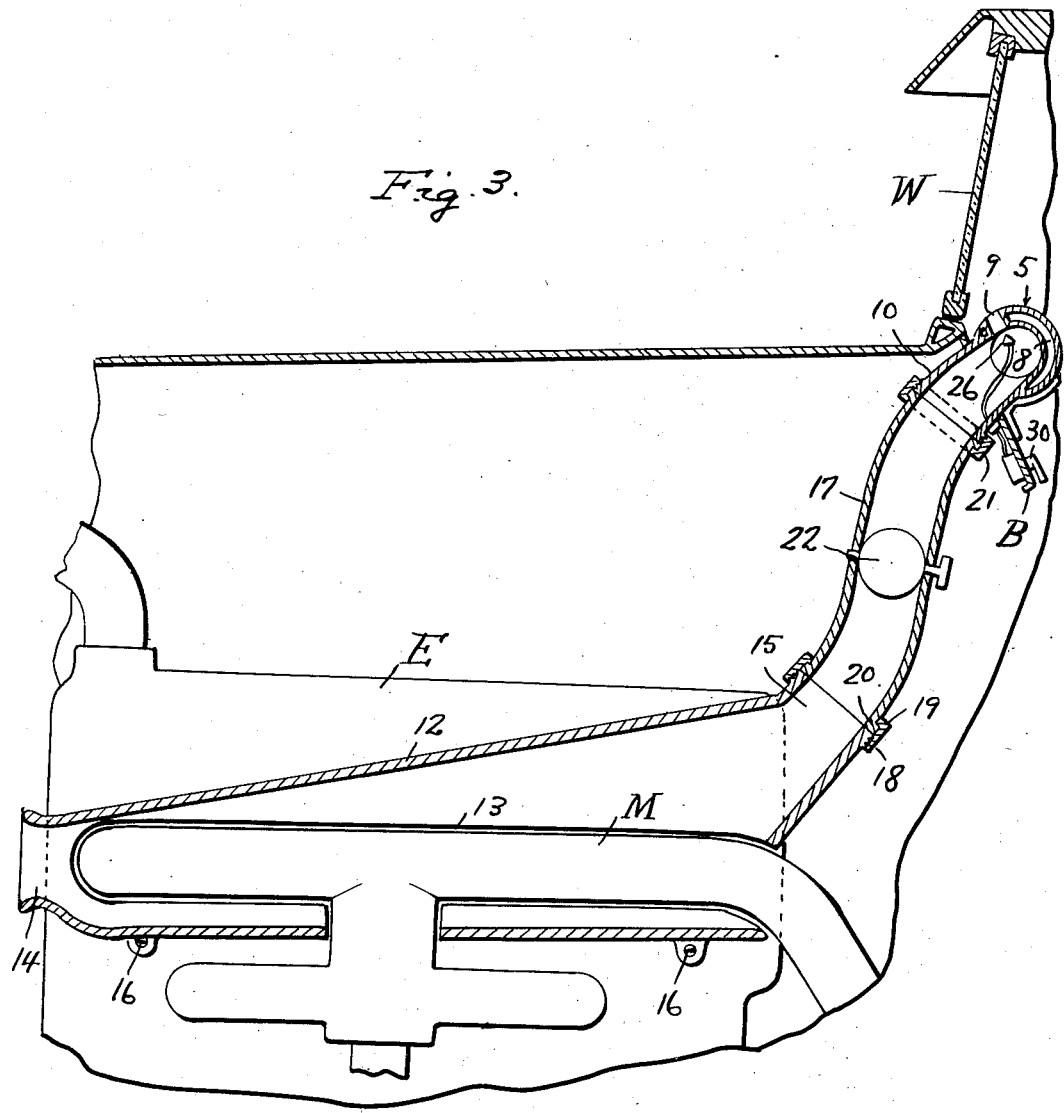
Figure 3 is a fragmentary detail elevational sectional view taken through a portion of the windshield and showing in section the invention as applied to the vehicle.
Figure 4:
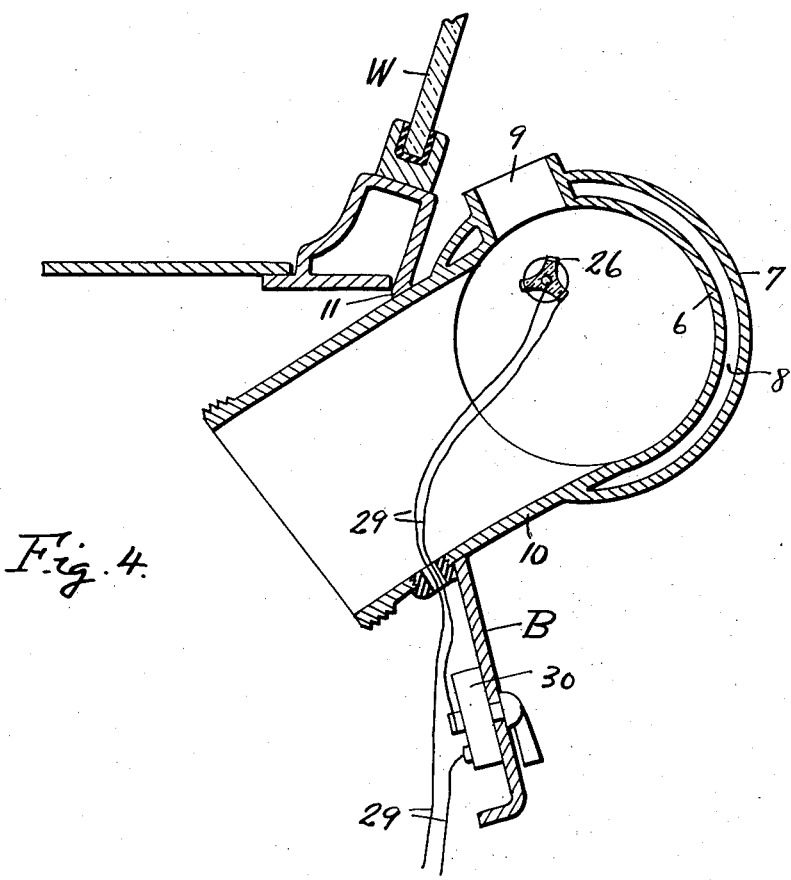
Figure 4 is a fragmentary sectional view taken through a portion of the vehicle and the heater casing.

Arranged in the casing 5, and extending longitudinally thereof is an electric heating element 26. As suggested in Figure 4, the heating element 26 consists of a bar triangular in cross section and longitudinally curved to conform to the curvature of the casing. Convoluted about the bar is a wire coil providing the heating medium. One end of the bar of the heating unit is receivable in a suitable boss 27 provided in the closed end of the casing 5. The other end of the bar of the heating element is supported in a suitable boss 28 provided in the cap 23.

The electric heating element just referred to, is suitably arranged in a circuit designated generally by the reference character 29, and the circuit 29 will of course include a battery or any other source of electrical energy not shown, together with a suitable manually operable control switch 30 suitably supported on the instrument board B.

Thus it will be seen that when for any reason, it is not desirable to use air heated by the exhaust manifold, or for any other reason, the air passing into casing 5 will be heated by the electrical heating unit 26 prior to passing out of the casing through the discharge apertures 9. However, and as may be found preferable, the air may be first heated by contact with the exhaust manifold when passing through casing 12, and then superheated by the heating element 26 prior to passing out of the casing 5 on to the windshield thus insuring air in a highly heated state being directed on to the windshield.

Even though I have herein shown and described the preferred embodiment of the invention, it is to be understood that the same is susceptible of changes, modifications and improvements coming within the scope of the appended claims.

Having thus described my invention, what I claim as new is:

1. A windshield heater including in combination a casing adapted to be supported adjacent the windshield, said casing comprising inner and outer walls to provide an air space therebetween, said casing provided with an air inlet, and with a series of discharge openings for substantially the full length of the casing to direct heated air on to the windshield, and means for supplying heated air to the casing.

2. A device for directing heated air on to the windshield of a vehicle comprising a substantially cylindrical casing having a longitudinal series of spaced outlets projecting radially therefrom together with a semi-cylindrical air space elongated for substantially the full length of said casing.

3. A windshield heater comprising in combination a relatively elongated casing provided with a substantially circular air chamber elongated longitudinally of the casing and provided with a longitudinal series of relatively spaced air outlets and a single air inlet, together with a substantially semi-cylindrical air chamber concentric to the first named chamber.

DOMINIC N. FANTACI.